US011450021B2

(12) United States Patent
Cai et al.

(10) Patent No.: US 11,450,021 B2
(45) Date of Patent: Sep. 20, 2022

(54) IMAGE PROCESSING METHOD AND APPARATUS, ELECTRONIC DEVICE, AND STORAGE MEDIUM

(71) Applicant: SenseTime International PTE. LTD., Singapore (SG)

(72) Inventors: Zhongang Cai, Singapore (SG); Cunjun Yu, Singapore (SG); Haiyu Zhao, Singapore (SG); Shuai Yi, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 16/921,372

(22) Filed: Jul. 6, 2020

(65) Prior Publication Data

US 2021/0201527 A1 Jul. 1, 2021

Related U.S. Application Data

(63) Continuation of application No. PCT/IB2020/052210, filed on Mar. 12, 2020.

(30) Foreign Application Priority Data

Dec. 30, 2019 (SG) .......................... 10201913754X

(51) Int. Cl.
*G06T 7/73* (2017.01)
*G06K 9/46* (2006.01)
(Continued)

(52) U.S. Cl.
CPC .............. *G06T 7/73* (2017.01); *G06K 9/6201* (2013.01); *G06T 5/50* (2013.01); *G06V 10/40* (2022.01); *G06T 2207/20221* (2013.01)

(58) Field of Classification Search
CPC ... G06T 7/73; G06T 5/50; G06T 2207/20221; G06K 9/46; G06K 9/6201
See application file for complete search history.

(56) References Cited

U.S. PATENT DOCUMENTS 8,379,969 B2 *  2/2013  Barrois ................ G01B 11/245
                                                        382/154
8,908,976 B2 * 12/2014  Kawanishi ........... G06V 40/161
                                                        382/118

(Continued)

FOREIGN PATENT DOCUMENTS

CN      102063607 A      5/2011
CN      106934397 A      7/2017
(Continued)

OTHER PUBLICATIONS

Singapore Patent Application No. 10201913754X; Search Report and Written Opinion; dated Feb. 6, 2020; 9 pages.

(Continued)

*Primary Examiner* — Gregory M Desire
(74) *Attorney, Agent, or Firm* — BakerHostetler

(57) ABSTRACT

The present disclosure relates to an image processing method and apparatus, an electronic device, and a storage medium. The method includes: acquiring at least two target images; determining an attention map of at least one target in each of the at least two target images according to a result of detecting target of each target image, where the attention map indicates the position of one target in a target image; and determining, based on each target image and the attention map of the at least one target in the each target image, a result of association that indicates whether a correspondence exists between at least some of targets in different target images.

19 Claims, 3 Drawing Sheets

(51) Int. Cl.
  *G06K 9/62* (2022.01)
  *G06T 5/50* (2006.01)
  *G06V 10/40* (2022.01)

(56) References Cited

U.S. PATENT DOCUMENTS

| | | | |
|---|---|---|---|
| 10,783,622 B2* | 9/2020 | Wang | G06N 3/088 |
| 10,943,145 B2* | 3/2021 | Wang | G06V 30/2504 |
| 11,216,927 B2* | 1/2022 | Peng | G06K 9/628 |
| 2015/0264401 A1 | 9/2015 | Hayashi | |
| 2017/0124433 A1 | 5/2017 | Chandraker et al. | |
| 2019/0197772 A1 | 6/2019 | Kim et al. | |
| 2019/0279074 A1* | 9/2019 | Lin | G06F 16/5854 |
| 2019/0304102 A1 | 10/2019 | Chen et al. | |
| 2019/0311223 A1 | 10/2019 | Wang et al. | |
| 2021/0090289 A1* | 3/2021 | Karanam | G06K 9/6262 |
| 2021/0201527 A1* | 7/2021 | Cai | G06K 9/6201 |

FOREIGN PATENT DOCUMENTS

| | | | |
|---|---|---|---|
| CN | 108229493 A | 6/2018 | |
| CN | 108229531 A | 6/2018 | |
| CN | 109635721 A | 4/2019 | |
| CN | 110298413 A | 10/2019 | |
| CN | 110443143 A | 11/2019 | |
| JP | 2018-026108 A | 2/2018 | |
| JP | 2018-534712 A | 11/2018 | |
| JP | 2019-125368 A | 7/2019 | |
| JP | 2019-200716 A | 11/2019 | |
| WO | WO 2019/111550 A1 | 6/2019 | |
| WO | WO 2019/221551 A1 | 11/2019 | |

OTHER PUBLICATIONS

Singapore Patent Application No. 10201913754X; Written Opinion; dated Jun. 5, 2020; 6 pages.
Cai et al.; "Leveraging Localization for Multi-camera Association"; Computer Vision and Pattern Recognition; Aug. 2020; 12 pages.
Fukui et al.; "Attention Branch Network: Learning of Attention Mechanism for Visual Explanation"; IEEE/CVF Conf. on Computer Vision and Pattern Recognition; 2019; p. 10697-10706.
Noh et al.; "Large-Scale Image Retrieval with Attentive Deep Local Features"; IEEE Int'l Conf. on Computer Vision; 2017; p. 3476-3485.

* cited by examiner

IMAGE PROCESSING METHOD AND APPARATUS, ELECTRONIC DEVICE, AND STORAGE MEDIUM

CROSS REFERENCE

This present application claims priority to PCT/IB2020/052210, which claims priority to Singapore Patent Application No. 10201913754X filed on Dec. 30, 2019, and entitled "IMAGE PROCESSING METHOD AND APPARATUS, ELECTRONIC DEVICE, AND STORAGE MEDIUM". The entireties of these applications are incorporated herein by reference.

TECHNICAL FIELD

The present disclosure relates to the field of computer vision technologies, and in particular, to an image processing method and apparatus, an electronic device, and a storage medium.

BACKGROUND

Computer vision is a technology that uses computer and related equipment to simulate biological vision. It can process a captured image or video to obtain three-dimensional information of a corresponding scene. In an application of computer vision, the captured image or video can be used for target detection to locate the position of a target object in the image.

SUMMARY

The present disclosure provides technical solutions for image processing.

According to one aspect of the present disclosure, provided is an image processing method, including:

acquiring at least two target images;

determining an attention map of at least one target in each of the at least two target images according to a result of detecting target of each target image, where the attention map indicates the position of one target in a target image; and determining, based on each target image and the attention map of the at least one target in the each target image, a result of association that indicates whether a correspondence exists between at least some of targets in different target images.

In one possible implementation, the determining an attention map of at least one target in each of the at least two target images according to a result of detecting target of each target image includes:

for one target in each target image, determining, according to the result of detecting target of the each target image, a first image region where the target is located; and determining an attention map of the target according to a first image region in the target image and a second image region other than the first image region in the target image.

In one possible implementation, the determining an attention map of the target according to a first image region in the target image and a second image region other than the first image region in the target image includes:

acquiring an initial image with an image size matching that of the target image;

setting a pixel value of a pixel in a first target image region in the initial image as a first pixel value, where the first target image region corresponds to the first image region; and setting a pixel value of a pixel in a second target image region in the initial image as a second pixel value to obtain the attention map of the target, where the second target image region corresponds to the second image region, and the first pixel value is not equal to the second pixel value.

In one possible implementation, the determining, based on each target image and the attention map of the at least one target in the each target image, a result of association that indicates whether a correspondence exists between at least some of targets in different target images includes:

fusing a target image with the attention map of one target in the target image to obtain a to-be-processed image;

performing feature extraction on each to-be-processed image respectively to obtain a feature map of the each to-be-processed image; and determining, according to the feature map of each to-be-processed image, a result of association that indicates whether a correspondence exists between at least some of targets in different target images.

In one possible implementation, the fusing a target image with the attention map of one target in the target image to obtain a to-be-processed image includes:

splicing a target image with the attention map of one target in the target image in a set dimension to obtain a to-be-processed image; or adding a target image with the attention map of one target in the target image in a set dimension to obtain a to-be-processed image.

In one possible implementation, the performing feature extraction on each to-be-processed image respectively to obtain a feature map of the each to-be-processed image includes:

performing feature extraction on each to-be-processed image respectively by using each network branch of a neural network to obtain a feature map of the each to-be-processed image, where feature extraction is performed on one to-be-processed image by using one network branch, and different network branches have the same network structure and network parameter.

In one possible implementation, the determining, according to the feature map of the each to-be-processed image, a result of association that indicates whether a correspondence exists between at least some of targets in different target images includes:

performing feature association on feature maps of any two of the to-be-processed images to obtain an associated feature map; and determining, based on the associated feature map, a result of association that indicates whether a correspondence exists between targets in target images corresponding to the two to-be-processed images, the feature maps of which are associated.

In one possible implementation, the determining, based on the associated feature map, a result of association that indicates whether a correspondence exists between targets in target images corresponding to the two to-be-processed images, the feature maps of which are associated, includes:

obtaining, based on the associated feature map, a score of association between targets in target images corresponding to the two to-be-processed images, the feature maps of which are associated; and in a case that the score of association is greater than a score threshold, determining that the targets in the target images corresponding to the two to-be-processed images, the feature maps of which are associated, are potentially associated.

In one possible implementation, the method further includes:

in a case that the score of association is less than or equal to the score threshold, determining that the targets in the target images corresponding to the two to-be-processed images, the feature maps of which are associated, are not associated.

In one possible implementation, the determining, based on the associated feature map, a result of association that indicates whether a correspondence exists between targets in target images corresponding to the two to-be-processed images, the feature maps of which are associated, includes:

obtaining, based on the associated feature map, a score of association between targets in target images corresponding to the two to-be-processed images, the feature maps of which are associated; and matching, according to the score of association between the respective targets in the target images corresponding to the two to-be-processed images, the feature maps of which are associated, targets in different target images to obtain a result of association that indicates whether a correspondence exists between respective targets in the different target images, where matched targets belong to different target images.

In one possible implementation, the matching, according to the score of association between the respective targets in the target images corresponding to the two to-be-processed images, the feature maps of which are associated, targets in different target images to obtain a result of association that indicates whether a correspondence exists between respective targets in the different target images, includes:

determining, according to the score of association between the respective targets in the target images corresponding to the two to-be-processed images, the feature maps of which are associated, a sum of scores of association between respective targets in a first target image in the different target images and respective targets in a second target image in the different target images; and in a case that the sum of scores of association is the maximum and greater than a predetermined sum-of-scores threshold, determining that the targets in the first target image respectively match the targets in the second target image.

In one possible implementation, the method further includes:

in a case that the maximum sum of scores of association in the sums of scores of association is less than or equal to the sum-of-scores threshold, determining that the targets in the first target image do not match the targets in the second target image.

In one possible implementation, the at least two target images are obtained by capturing a same scene synchronously at different angles of view.

According to another aspect of the present disclosure, provided is an image processing apparatus, including:

an acquisition module, configured to acquire at least two target images;

a first determination module, configured to determine an attention map of at least one target in each of the at least two target images according to a result of detecting target of each target image, where the attention map indicates the position of one target in a target image; and a second determination module, configured to determine, based on each target image and the attention map of the at least one target in the each target image, a result of association that indicates whether a correspondence exists between at least some of targets in different target images.

In one possible implementation, the first determination module includes:

a first determination sub-module, configured to determine, according to the result of detecting target of each target image, a first image region where the target is located for one target in the each target image; and a second determination sub-module, configured to determine an attention map of the target according to a first image region in the target image and a second image region other than the first image region in the target image.

In one possible implementation, the second determination sub-module includes:

an acquisition unit, configured to acquire an initial image with an image size matching that of the target image;

a first setting unit, configured to set a pixel value of a pixel in a first target image region in the initial image as a first pixel value, where the first target image region corresponds to the first image region; and a second setting unit, configured to set a pixel value of a pixel in a second target image region in the initial image as a second pixel value to obtain the attention map of the target, where the second target image region corresponds to the second image region, and the first pixel value is not equal to the second pixel value.

In one possible implementation, the second determination module includes:

a fusion sub-module, configured to fuse a target image with the attention map of one target in the target image to obtain a to-be-processed image;

a feature extraction sub-module, configured to perform feature extraction on each to-be-processed image respectively to obtain a feature map of the each to-be-processed image; and a determination sub-module, configured to determine, according to the feature map of each to-be-processed image, a result of association that indicates whether a correspondence exists between at least some of targets in different target images.

In one possible implementation, the fusion sub-module includes:

a splicing unit, configured to splice a target image with the attention map of one target in the target image in a set dimension to obtain a to-be-processed image; or a summing unit, configured to add a target image with the attention map of one target in the target image in a set dimension to obtain a to-be-processed image.

In one possible implementation, the feature extraction sub-module includes:

a branch unit, configured to perform feature extraction on each to-be-processed image respectively by using each network branch of a neural network to obtain a feature map of the each to-be-processed image, where feature extraction is performed on one to-be-processed image by using one network branch, and different network branches have the same network structure and network parameter.

In one possible implementation, the feature extraction sub-module includes:

an association unit, configured to perform feature association on feature maps of any two of the to-be-processed images to obtain an associated feature map; and a determination unit, configured to determine, based on the associated feature map, a result of association that indicates whether a correspondence exists between targets in target images corresponding to the two to-be-processed images, the feature maps of which are associated.

In one possible implementation, the determination unit includes:

a first association sub-unit, configured to obtain, based on the associated feature map, a score of association between targets in target images corresponding to the two to-be-processed images, the feature maps of which are associated; and a first determination sub-unit, configured to, in a case that the score of association is greater than a score threshold, determine that the targets in the target images corresponding to the two to-be-processed images, the feature maps of which are associated, are potentially associated.

In one possible implementation, the apparatus further includes:

a second determination sub-unit, configured to, in a case that the score of association is less than or equal to the score threshold, determine that the targets in the target images corresponding to the two to-be-processed images, the feature maps of which are associated, are not associated.

In one possible implementation, the determination unit includes:

a second association sub-unit, configured to obtain, based on the associated feature map, a score of association between targets in target images corresponding to the two to-be-processed images, the feature maps of which are associated; and a matching sub-unit, configured to match, according to the score of association between the respective targets in the target images corresponding to the two to-be-processed images, the feature maps of which are associated, targets in different target images to obtain a result of association that indicates whether a correspondence exists between respective targets in the different target images, where matched targets belong to different target images.

In one possible implementation, the matching sub-unit is configured to:

determine, according to the score of association between the respective targets in the target images corresponding to the two to-be-processed images, the feature maps of which are associated, a sum of scores of association between respective targets in a first target image in the different target images and respective targets in a second target image in the different target images; and In a case that the sum of scores of association is the maximum and greater than a predetermined sum-of-scores threshold, determine that the targets in the first target image respectively match the targets in the second target image.

In one possible implementation, the matching sub-unit is further configured to:

in a case that the maximum sum of scores of association in the sums of scores of association is less than or equal to the sum-of-scores threshold, determining that the targets in the first target image do not match the targets in the second target image.

In one possible implementation, the at least two target images are obtained by capturing a same scene synchronously at different angles of view.

According to one aspect of the present disclosure, provided is an electronic device, including:

a processor; and a memory configured to store processor-executable instructions, where the processor is configured to execute the foregoing image processing method.

According to one aspect of the present disclosure, provided is a computer-readable storage medium, having computer program instructions stored thereon, where when the computer program instructions are executed by a processor, the foregoing image processing method is implemented.

According to one aspect of the present disclosure, provided is a computer program, including a computer readable code, where when the computer readable code is running by an electronic device, the processor in the electronic device instructions for implementing the foregoing image processing method.

In embodiments of the present disclosure, at least two target images may be acquired, then, an attention map of at least one target in each of the at least two target images is determined according to a result of detecting target of each target image, and then a result of association that indicates whether a correspondence exists between at least some of targets in different target images is determined based on each target image and the attention map of the at least one target in the each target image. Thus, targets in multiple different target images can be associated by using the obtained result of association, so as to establish an association between targets in a scene photographed by multiple image capture apparatuses, thereby increasing the range of the field of view, and thus more comprehensive information of the scene can be obtained.

It should be understood that the above general description and the following detailed description are merely exemplary and explanatory, and are not intended to limit the present disclosure.

The other features and aspects of the present disclosure can be described more clearly according to the detailed descriptions of the exemplary embodiments in the accompanying drawings.

BRIEF DESCRIPTION OF THE DRAWINGS

The accompanying drawings here incorporated in the specification and constituting a part of the specification illustrate the embodiments consistent with the present disclosure and are intended to explain the technical solutions of the present disclosure together with the specification.

DETAILED DESCRIPTION

Figure 1:
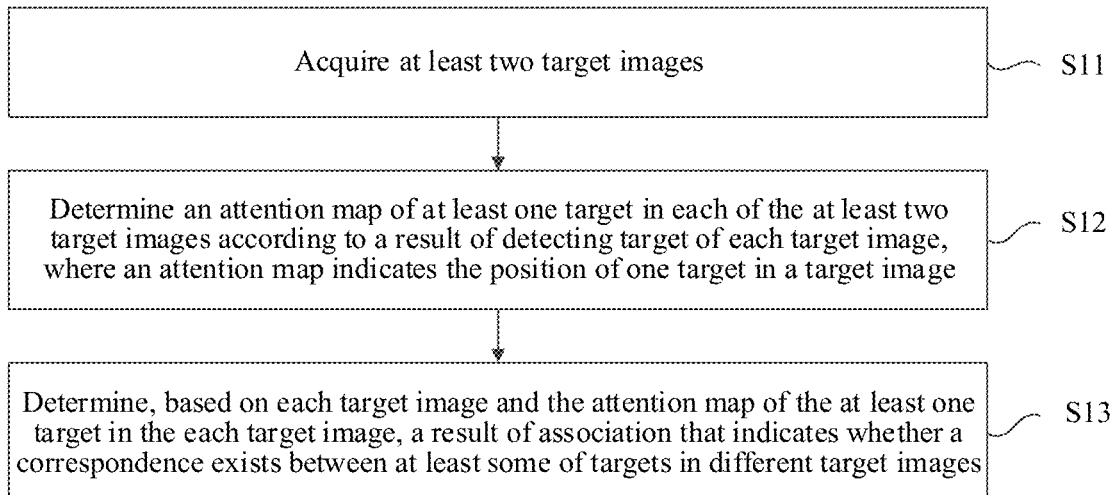
FIG. 1 shows a flowchart of an image processing method according to embodiments of the present disclosure.

The various exemplary embodiments, features, and aspects of the present disclosure are described below in detail with reference to the accompanying drawings. The same signs in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

The term "and/or" as used herein merely describes an association relationship between associated objects, indicating that there may be three relationships, for example, A and/or B, which may indicate that A exists separately, both A and B exist, and B exists separately. In addition, the term "at least one" as used herein means any one of multiple elements or any combination of at least two of the multiple elements, for example, including at least one of A, B, or C, which indicates that any one or more elements selected from a set consisting of A, B, and C are included.

In addition, numerous details are given in the following detailed description for the purpose of better explaining the present disclosure. A person skilled in the art should understand that the present disclosure may also be implemented without some specific details. In some examples, methods, means, elements, and circuits well known to a person skilled in the art are not described in detail so as to highlight the subject matter of the present disclosure.

In solutions for image processing provided in the embodiments of the present disclosure, at least two target images may be acquired, an attention map of at least one target in each of the at least two target images is determined according to a result of detecting target of each target image, where the attention map may indicate the position of one target on the target image. Then, a result of association that indicates whether a correspondence exists between at least some of targets in different target images may be determined based on each target image and the attention map of the at least one target in the each target image. Thus, one or more targets in different target images are associated according to the obtained result of association so as to obtain more complete information of a photographed target. For example, a top view and a side view of a same target are associated, and thus more comprehensive information of the target can be obtained.

In the related art, generally, targets in multiple target images are projected to a common vector space, and targets associated with each other in different target images are determined by calculating distances between projections of different targets in the common vector space. In such a target association manner, when the targets are projected to the common vector space, it is required to calibrate a projection matrix used by projection, while the projection matrix would be impacted by the pose of an image capture apparatus, i.e., a change in the pose of the image capture apparatus would cause matrix misalignment, and thus a large error exists in an obtained result of association. However, in the solutions for image processing provided in the embodiments of the present disclosure, a result of association that indicates whether a correspondence exists between multiple targets in different target images is obtained based on each target image and the attention map of the target in the each target image, there is no need to project targets to a common vector space, it is not required to calibrate the projection vector, the impact of an image capture apparatus on the result of association is low, and the accuracy of association between the targets can be improved.

The present disclosed embodiments can be applied to extended scenarios such as target labeling and image association and so on, for example, multiple images collected from different perspectives in the same scene can be correlated, and for another example, the same target in multiple images can be labeled. The present disclosure does not limit specific application scenarios. The solutions for image processing provided in the embodiments of the present disclosure are described below through embodiments.

FIG. 1 shows a flowchart of an image processing method according to embodiments of the present disclosure. The image processing method may be executed by a terminal device, a server, or other information processing devices, where the terminal device may be a User Equipment (UE), a mobile device, a user terminal, a terminal, a cellular phone, a cordless phone, a Personal Digital Assistant (PDA), a handheld device, a computing device, a vehicle-mounted device, a wearable device, or the like. In some possible implementations, the image processing method may be implemented by a processor by invoking computer-readable instructions stored in a memory. The solutions for image processing in the embodiments of the present disclosure are described by taking an image processing apparatus as an execution subject.

As shown in FIG. 1, the image processing method includes the following steps.

At step S11, at least two target images are acquired.

In the embodiments of the present disclosure, at least two target images captured by an image capture apparatus may be acquired. Different target images may be derived from a same image capture apparatus, or may be derived from different image capture apparatuses. A target image may be one respectively captured image, or may be one image frame in an acquired video stream. Here, the target image may be a color image, where the color image can be understood as an image formed by superposing three colors, i.e., red (R), green (G), and blue (B).

At step S12, an attention map of at least one target in each of the at least two target images is determined according to a result of detecting target of each target image, where the attention map indicates the position of one target in a target image.

In the embodiments of the present disclosure, target detection may be performed on at least two target images respectively to obtain a result of detecting target of each target image, and then an attention map of one or more objects is obtained according to the result of detecting target of each target image. Here, the result of detecting target may be a detection result for projection of a target in the target image, and the detection result may be represented by a detection box. For example, in a traffic scene, the target may be an object, such as a pedestrian, a motor vehicle, or a non-motor vehicle, that can pass through in a traffic road, and the result of detecting target may be a detection box for annotating the projection of the target in the target image. Here, one attention map may indicate the position of one target in the target image, and the position may be an image position.

Here, if there are multiple targets, one target may be selected from the multiple targets, an attention map for the image is obtained, and thus interference occurring between the multiple targets can be decreased.

In one possible implementation, for one target in each target image, a first image region where the target is located may be determined according to a result of detecting target of the each target image, and then an attention map of the target is determined according to the first image region in the target image and a second image region other than the first image region in the target image.

In this implementation, for any one target image, a first image region of the target, annotated by the detection box, in the target image is determined according to a detection box corresponding to a result of detecting target of the target image, where the first image region may be an enclosed image region. Then an attention map of the target is determined according to the first image region in the target image and a second image region other than the first image region in the target image, for example, a pixel value of a pixel in the first image region may be copied and a pixel value in the second image region is changed, or copied pixel values in the first image region is increased or decreased, so that the pixel value in the first image region is obviously different from the pixel value in the second image region, so as to obtain an attention map of one target in the target image. Thus, the image region where the target is located in the attention map is different from other image regions, thereby improving the accuracy of a result of association between targets in different target images.

In one example of this embodiment, an initial image with a size matching that of the target image is acquired, a pixel value of a pixel in a first target image region in the initial image is set as a first pixel value, a pixel value of a pixel in a second target image region in the initial image is set as a second pixel value to obtain the attention map of the target, where the second target image region corresponds to the second image region, and the first pixel value is not equal to the second pixel value.

In this example, an initial image may be generated, or the target image may be copied to obtain an initial image. The image size of the initial image matches that of the target image, i.e., it can be understood that the initial image may have a same size as that of the target image, for example, the image size of the target image may be 3×3 cm, and then the image size of the initial image is also 3×3 cm. The initial image may include the first target image region, the image position of the first target image region in the initial image may be the same as the image position of the first image region in the target image, the pixel value in the first target image region may be set as the first pixel value, the first pixel value may be the same as the pixel value of the pixel in the first image region, i.e., the first target image region is a color image region. Alternatively, the first pixel value may be a predetermined value, for example, a pixel value corresponding to white. The second target image region may be an image region that does not include the first target image region in the initial image, and the pixel value in the second image region may be set as the second pixel value. The second pixel value may be a predetermined pixel value, for example, a pixel value corresponding to black, the second pixel value is different from the first pixel value, and thus, the second image region can be distinguished from the first image region through the pixel value of the pixel. In such a manner, the attention map corresponding to the target can be obtained, and the attention map can display an image region corresponding to the target, i.e., the attention map may indicate the position of the target, thereby improving the accuracy of a result of association between targets in different target images.

For example, in a case that the target image corresponds to one channel, the pixel value of the pixel in the first target image region of the initial image may set directly to be 1, and the pixel value of the pixel in the second target image region may be set to be 0 to obtain the attention map. In a case that the target image corresponds to three channels, the pixel value of the pixel in the first image region of the target image may be copied to the target image region of the initial image, and the pixel value of the pixel in the second image region may be set to be 0 to obtain the attention map.

At step S13, a result of association that indicates whether a correspondence exists between at least some of targets in different target images is determined based on each target image and the attention map of the at least one target in the each target image.

In the embodiments of the present disclosure, feature extraction may be performed on each target image and the attention map of one target in the target image by using a trained neural network to obtain feature maps corresponding to multiple target images. Then a result of association that indicates whether a correspondence exists between targets in different target images is determined according to the feature maps corresponding to the respective target images. The correspondence here may be understood as the targets in different target images being the same target. Here, the neural network may include at least two network branches, one target image and the attention map of one target in the target image may be used as an input of one network branch. The result of association between the result of detecting targets of different target images may be an output of the neural network, or feature processing may be performed on the output of the neural network, for example, processing such as comparison and normalization may be performed on an output result, and the result of association between the result of detecting targets of different target images can be obtained.

Here, the target image is used as an input of the neural network, compared with an image including only a target being used as the input of the neural network, the target image further includes an image surrounding the target, and thus, more comprehensive image features can be obtained from the target image In addition, the attention map corresponding to the target is also used as the input of the neural network, position information of the target may be provided, and thus, the result of association between the targets is more accurate.

In one possible implementation, a target image is fused with the attention map of one target in the target image to obtain a to-be-processed image, then feature extraction is performed on the to-be-processed image respectively to obtain a feature map of the to-be-processed image, and then a result of association that indicates whether a correspondence exists between at least some of targets in different target images is determined according to the feature map of the to-be-processed image.

In this implementation, each target image may be fused with the attention map of one target in the target image to obtain multiple to-be-processed images. Then the multiple to-be-processed images may be used as input information of the neural network, feature extraction is performed on each to-be-processed image by using the neural network, and finally the result of association between the targets in different target images can be obtained. By fusing a target image with the attention map of one target in the target image, image information from two images can be combined better, and extracted image features can be more accurate.

In one example, each target image is spliced with an attention map of one target in the target image in a set dimension to obtain each to-be-processed image; or each target image is added with an attention map of one target in the target image in a set dimension to obtain each to-be-processed image.

In this example, the splicing a target image with the attention map of one target in the target image in a set dimension may be understood as, for example, a target image is spliced with the attention map of one target in the target image in image length, image width, or dimension of depth, i.e., dimension of channel (such as three channels, i.e., RGB), by taking splicing in dimension of depth as an example, that is, the target image is spliced with the attention mage in dimension of depth to form a six-channel image, and the image size of an obtained to-be-processed image may be a sum of the sizes of the target image and the attention map in the set dimension. Here, in a case that the target image and the attention map have a same depth, the attention map provides not only the position information of the target but also image features of the target, so that the feature maps extracted by the neural network have more accurate and comprehensive image features.

In this example, adding a target image with the attention map of one target in the target image in a set dimension may be adding a target image with the attention map of one target in the target image in dimension of depth, i.e., dimension of channel. Here, the number of channels corresponds to the dimension of depth of the image. Each target image and the attention map of the target image may have a same number of channels, for example, the target image and the attention map may both be RGB images, and both have three channels. Alternatively, the number of channels of each target image and the attention map of one target in the target image may be different, for example, the target image has three channels and the attention map has one channel. The target image may be added with the attention map of the target image in dimension of depth, for example, R values, G values, and B values of pixels on corresponding positions of two images are added together, or when the target image has three channels, while the attention map has one channel, the R value of the pixel of the target image on the corresponding position is added with the pixel value of the pixel of the attention map to obtain a to-be-processed image, and the number of channels of the to-be-processed image is the same as the number of channels of the target image.

In one example, feature extraction may be performed on each to-be-processed image respectively by using each network branch of the neural network to obtain a feature map of the to-be-processed image, where feature extraction is performed on one to-be-processed image by using one network branch, and different network branches have the same network structure and network parameter.

In this example, feature extraction may be performed on each to-be-processed image by using network branches of the neural network, for example, by performing feature extraction, such as convolution, pooling, and reduction of the number of channels, on the input each to-be-processed image, a feature map of each network branch can be obtained. Network results of respective network branches may be the same, and the respective network branches may share a network parameter, thereby reducing the complexity of the neural network.

In one example, feature association may be performed on feature maps of any two of the to-be-processed images to obtain an associated feature map, and a result of association that indicates whether a correspondence exists between targets in target images corresponding to the two to-be-processed images, the feature maps of which are associated, is determined based on the associated feature map.

In this example, feature association may be performed in combination with feature mages corresponding to any two of multiple to-be-processed images to obtain an associated feature map. Then feature extraction is performed on the obtained associated feature map by further using a neural network, for example, by performing feature extraction, such as multiple convolutions, batch normalization, linear rectification, and full connection, on the obtained associated feature map, an output of the neural network can be obtained, and the output of the neural network can be used as a result of association between targets in target images corresponding to the any two to-be-processed images. Alternatively, further processing, for example, processing such as normalization and standardization, may be performed on the output of the neural network, and a result of association between targets in target images corresponding to the any two to-be-processed images can be obtained. In this implementation, targets in different target images may be compared in a manner of performing feature association on feature maps of the any two to-be-processed images so as to obtain a result of association between the targets.

In one example, a score of association between targets in target images corresponding to the two to-be-processed images, the feature maps of which are associated, may be determined based on the associated feature map, and in a case that the score of association is greater than a score threshold, it is determined that the targets in the target images corresponding to the two to-be-processed images, the feature maps of which are associated, are potentially associated.

In this example, feature extraction may be performed on the associated feature map by using a neural network, for example, feature extraction operations, such as multiple convolutions, batch normalization, linear rectification, and full connection, on the obtained associated feature map, a score of association between targets in target images corresponding to any of the to-be-processed images can be obtained, where the score of association may represent a degree of association between any two targets in target images corresponding to the any of the to-be-processed images, for example, the score of association is high, and it can be indicated that the degree of association between the two targets is the large; and the score of association is low, and it can be indicated that the degree of association between the two targets is small. In this example, the score of association may be compared with a predetermined score threshold, and if the obtained score of association is greater than the score threshold, it can be considered that the two targets are potentially associated, i.e., the two targets may represent a same target. In such a manner, targets, between which a correspondence may be exist, can be quickly screened from two target images according to the score of association between the targets.

In one example, in a case that the score of association is less than or equal to the score threshold, it is determined that the targets in the target images corresponding to the two to-be-processed images, the feature maps of which are associated, are not associated.

In this example, if the obtained score of association is less than or equal to the predetermined score threshold, it can be considered that no correspondence exists between the two targets, i.e., the two targets do not represent a same target. In such a manner, whether two targets are a same target can be quickly determined according to the score of association between any two targets.

In one possible implementation, a score of association between targets in target images corresponding to the two to-be-processed images, the feature maps of which are associated, is determined based on the associated feature map, and then targets in different target images are matched according to the score of association between the respective targets in the target images corresponding to the two to-be-processed images, the feature maps of which are associated to obtain a result of association that indicates whether a correspondence exists between respective targets in the different target images, where matched targets belong to different target images.

In this implementation, each target image may include multiple targets, where a certain target in one target image may be potentially associated with multiple result of detecting targets of another target image, but in fact, a certain target in one target image corresponds to one target in another target image, and therefore, targets in different target images may be matched one-to-one according to the score of association between the targets in the target images corresponding to the to-be-processed image, so that one target in one target image is matched with one target in another target image to obtain a result of association that indicates whether a correspondence exists between respective targets in the different target images, thereby implementing global matching between multiple targets in the different target images. Here, matched targets may further be annotated, for example, the matched targets may be annotated with a same serial number or a same color or tag, so that it is easy to distinguish a same target.

In one example of this implementation, a sum of scores of association between respective targets in a first target image in the different target images and respective targets in a second target image in the different target images is determined according to the score of association between the respective targets in the target images corresponding to the two to-be-processed images, the feature maps of which are associated, and in a case that the sum of scores of association is the maximum and greater than a predetermined sum-of-scores threshold, it is determined that the targets in the first target image respectively match the targets in the second target image to obtain a matching result.

In this example, the targets in two target images may be matched in a manner of calculating a sum of scores of association between respective targets. That is, multiple targets in the first target image are matched one-to-one with multiple targets in the second target image, and then sums of scores of association are obtained according to a calculated score of association between matched target pairs. In a case that the sum of scores of association is the maximum, it can be considered that the target in the first target image is optimally matched with the target in the second target image, and if the maximum sum of scores of association is greater than a predetermined sum-of-scores threshold, it can be determined that the multiple targets in the first target image have a one-to-one correspondence to the multiple targets in the second target image, and the first target image and the second target image are images captured for a same scene.

In this example, in a case that the maximum sum of scores of association in the sums of scores of association is less than or equal to the sum-of-scores threshold, it is determined that the targets in the first target image do not match the targets in the second target image.

Here, the maximum sum of scores of association is less than or equal to the predetermined sum-of-scores threshold, it can be considered that in a case that the target in the first target image is optimally matched with the target in the second target image, the maximum sum of scores of association does not reach the predetermined sum-of-scores threshold, it can be considered that no correspondence exists between the multiple targets in the first target image and the multiple targets in the second target image, and the first target image and the second target image are not images captured for a same scene, for example, the first target image and the second target image include some same targets or include some different targets, or the targets in the first target image and the second target image are completely different.

For example, it is assumed that three targets, which are A, B, and C respectively, exist in the first target image, and three targets, which are a, b, and c respectively, exist in the second target image. The score of association between A in the first target image and a in the second target image may be represented by Aa. The sum of scores of association between targets may be obtained by randomly pairing the three targets in the first target image with the three targets in the second target image, and then adding the scores of association between targets pairwise, and after random pairing each time, one target in the second target image is allocated to one target in the first target image. That is, Aa, Bb, and Cc correspond to one random pairing, Aa, Bc, and Cb correspond to one random pairing, Ab, Ba, and Cc correspond to one random pairing, Ab, Bc, and Ca correspond to one random pairing, Ac, Ba, and Cb correspond to one random pairing, and Ac, Bb, and Ca correspond to one random pairing, where one random pairing when the sum of scores of association is the maximum is selected, the sum of scores of association between randomly paired targets may be the maximum sum-of-scores of association.

It should be noted that, when targets in different target images are paired, a specific allocation method is not limited in the present disclosure, here multiple targets in one target image is paired to multiple targets in another target image by using some related algorithms, for example, a greedy algorithm, so that the sum of scores of association obtained after the pairing is the maximum, and thus the targets in the different target images are optimally matched.

By means of the solutions for image processing provided in the embodiments of the present disclosure, an accurate result of association between different targets can be obtained based on each target image and an attention map of at least one target in each target image, and thus, targets in multiple different target images can be associated by using the obtained result of association, an association between the target images captured by multiple image capture apparatuses is established, the range of the field of view is increased, and more comprehensive information of the current scene can be obtained.

Figure 2:
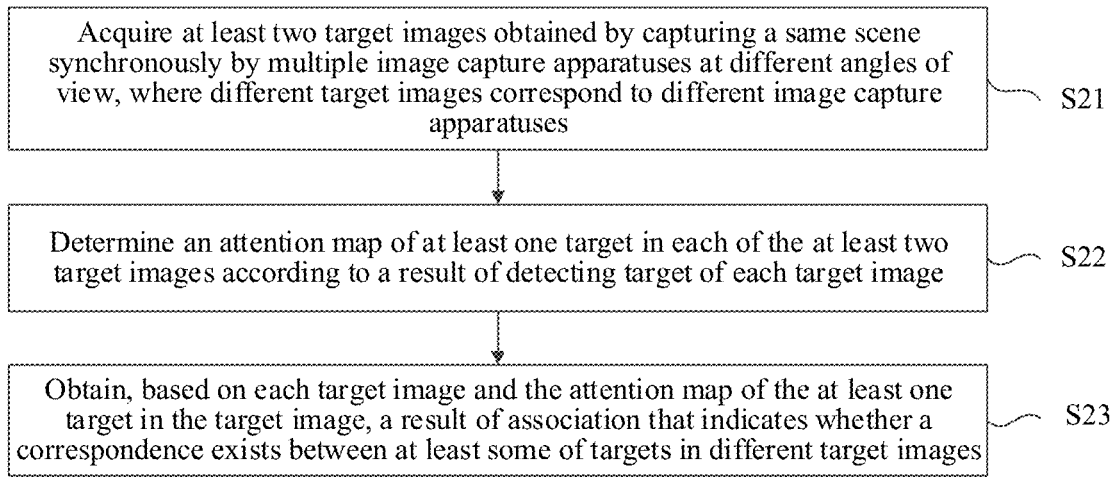
FIG. 2 shows a flowchart of an example of an image processing method according to embodiments of the present disclosure.

FIG. 2 shows a flowchart of an example of an image processing method according to embodiments of the present disclosure.

An example of the embodiments of the present disclosure further provides an application scene where at least two target images obtained by capturing a same scene synchronously by multiple image capture apparatuses at different angles of view are associated. As shown in FIG. 2, the image processing method may include the following steps.

At step S21, at least two target images obtained by capturing a same scene synchronously by multiple image capture apparatuses at different angles of view are acquired, where different target images correspond to different image capture apparatuses.

At step S22, an attention map of at least one target in each of the at least two target images is determined according to a result of detecting target of each target image.

At step S23, a result of association that indicates whether a correspondence exists between at least some of targets in different target images is obtained based on each target image and the attention map of the at least one target in the target image.

In this example, multiple image capture apparatuses may photograph a same scene synchronously at different angles of view, the angle and position of each image capture apparatus are different, and thus target images obtained by photographing the same scene at different angles of view can be obtained, for example, a main view and a top view of a same object. The same targets in the target images synchronously captured by the multiple image capture apparatuses are matched according to a result of association between targets in different target images, for example, the same targets in the different target images are annotated with the same number, color or shape or the like, so as to implement association between the same targets in the different target images.

This example is described below by associating targets in two target images.

Figure 3:
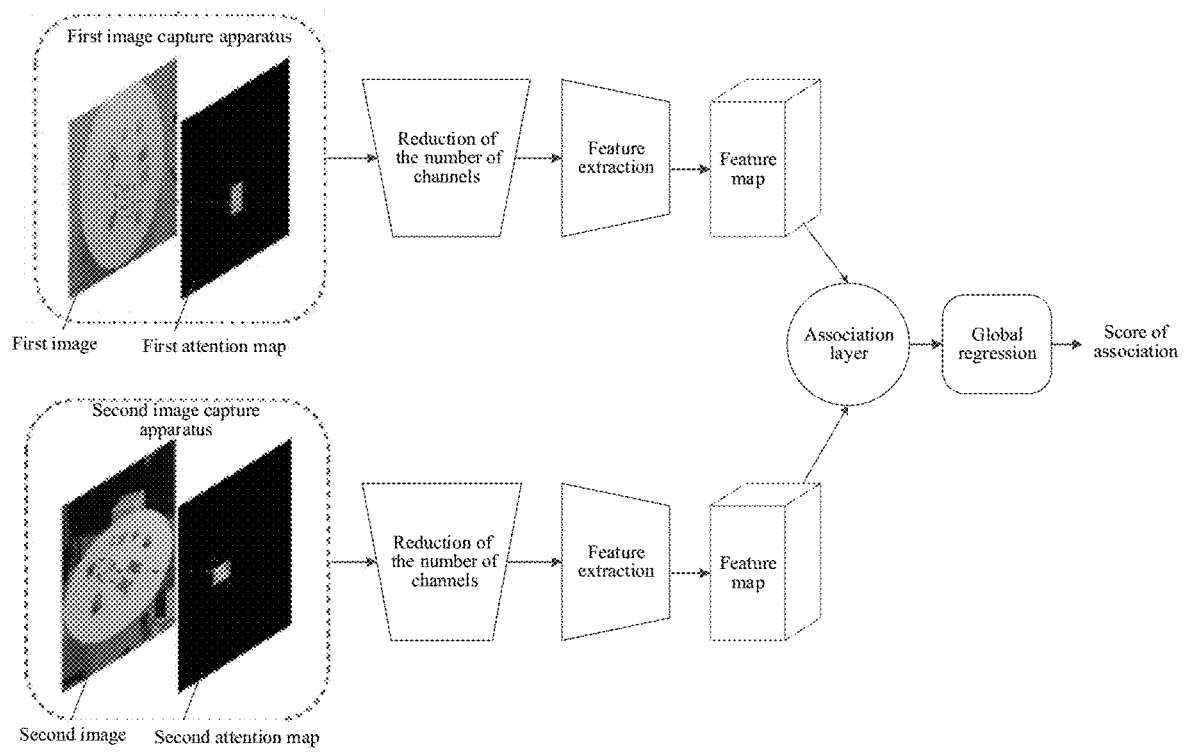
FIG. 3 shows a block diagram of an example of obtaining a result of association of two targets by using a neural network according to embodiments of the present disclosure.

FIG. 3 shows a block diagram of an example of obtaining a result of association of two targets by using a neural network according to embodiments of the present disclosure.

Multiple image capture apparatuses may photograph a same scene synchronously at different angles of view, and target images captured by any two of the multiple image capture apparatuses may be a first image captured by a first image capture apparatus and a second image captured by a second image capture apparatus. Target detection is performed respectively on the first image and the second image to determine targets respectively included in the first image and the second image, where there may be multiple targets in each target image. Any one target may be selected from multiple targets in each target image, and a result of association between two targets may be determined by using a neural network for the selected targets. The first image includes a first target, and an attention map obtained according to the first target may be a first attention map. The second image includes a second target, and an attention map obtained according to the second target may be a second attention map.

The neural network may include two network branches, which may be a first network branch and a second network branch. The first image and the first attention map may be input to the first network branch, and the second image and the second attention map may be input to the second network branch. By taking the process of the first network branch as an example, the first image and the first attention map may be spliced in dimension of depth to obtain an input image, where the first image corresponds to three channels, the first attention map corresponds to three channels, the input image corresponds to six channels, and each channel corresponds to one depth. Then convolution processing may be performed on the input image by using the first network branch, the number of channels of the input image is reduced to from six to three, and then feature extraction is performed on the input image, of which the number of channels is reduced, to obtain a feature map of the first network branch, where the feature map may be a tensor having three dimension features, and the three dimension features may include a length feature, a width feature, and a depth feature. During the feature extraction, multiple convolution processing may be performed on an initial feature map, of which the number of channels is reduced. A feature map of the second network branch can be obtained in a same manner.

Then an associated feature map can be obtained by associating the feature map of the first network branch with the feature map of the second network branch by using an association layer of the neural network. When the feature map of the first network branch is associated with the feature map of the second network branch, the following association formula (1) can be used:

$$c_{AB}(i,j,k) = f_{B(i,j)}{}^T f_{A(i_k,j_k)} \qquad \text{Formula (1)},$$

where $c_{AB}$ may be the associated feature map, and $c_{AB} \in \mathbb{R}^{h \times w \times (h \times w)}$, where $\mathbb{R}^{h \times w \times (h \times w)}$ represents a set of real numbers. $f_A$ is a feature vector of the feature map of the first network branch, $f_B$ is a feature vector of the feature map of the second network branch, i represents a row of the feature map and corresponds to the length feature of the feature map, j represents the column of the feature map and corresponds to the width feature of the feature map, and both i and j are positive integers, and k represents an index corresponding to the row and column, for example, $k \in \{1, 2, 3 \ldots, i \times j\}$.

Then a score of association between the first target and the second target can be obtained by performing global regression processing on the associated feature map. The global regression processing here may include multiple convolution processing, batch normalization processing, linear rectification processing, and full connection layer processing. In such as manner, a score of association between any two targets in the first image and the second image can be obtained. Then multiple first targets and multiple second targets may be matched one-to-one according to scores of association between multiple target pairs, so that a sum of scores of association between multiple target pairs is the maximum. After matched target pairs are determined, matched targets may be annotated in the first image and the second image.

By means of the foregoing solutions for image processing, a target image includes not only image features of an image region where a target is located, but also image features of an image region surrounding the target, and thus, more comprehensive image features can be obtained by means of the target image. An attention map includes position information of the target and the image features, and a result of association that indicates whether two targets are associated can be obtained further in combination with the position information of the target and the image features.

It can be understood that the foregoing various method embodiments mentioned in the present disclosure may be combined with each other to form a combined embodiment without departing from the principle logic. Details are not described herein repeatedly due to space limitation.

In addition, the present disclosure further provides an image processing apparatus, an electronic device, a computer-readable storage medium, and a program, which can all be configured to implement any one of the image processing methods provided in the present disclosure. For corresponding technical solutions and descriptions, please refer to the corresponding content in the method section. Details are not described repeatedly.

A person skilled in the art can understand that, in the foregoing methods of the specific implementations, the order in which the steps are written does not imply a strict execution order which constitutes any limitation to the implementation process, and the specific order of executing the steps should be determined by functions and possible internal logics thereof.

Figure 4:
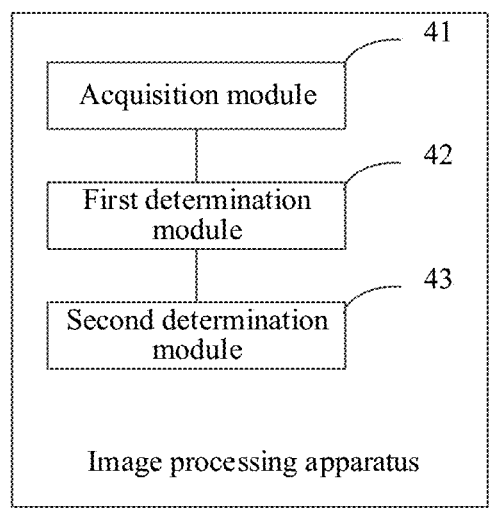
FIG. 4 shows a block diagram of an image processing apparatus according to embodiments of the present disclosure.

FIG. 4 shows a block diagram of an image processing apparatus according to embodiments of the present disclosure. As shown in FIG. 4, the image processing apparatus includes:

an acquisition module 41, configured to acquire at least two target images;

a first determination module 42, configured to determine an attention map of at least one target in each of the at least two target images according to a result of detecting target of each target image, where the attention map indicates the position of one target in a target image; and a second determination module 43, configured to determine, based on each target image and the attention map of the at least one target in the each target image, a result of association that indicates whether a correspondence exists between at least some of targets in different target images.

In one possible implementation, the first determination module 42 includes:

a first determination sub-module, configured to determine, according to the result of detecting target of each target image, a first image region where the target is located for one target in the each target image; and a second determination sub-module, configured to determine an attention map of the target according to a first image region in the target image and a second image region other than the first image region in the target image.

In one possible implementation, the second determination sub-module includes:

an acquisition unit, configured to acquire an initial image with an image size matching that of the target image;

a first setting unit, configured to set a pixel value of a pixel in a first target image region in the initial image as a first pixel value, where the first target image region corresponds to the first image region; and a second setting unit, configured to set a pixel value of a pixel in a second target image region in the initial image as a second pixel value to obtain the attention map of the target, where the second target image region corresponds to the second image region, and the first pixel value is not equal to the second pixel value.

In one possible implementation, the second determination module 43 includes:

a fusion sub-module, configured to fuse a target image with the attention map of one target in the target image to obtain a to-be-processed image;

a feature extraction sub-module, configured to perform feature extraction on a to-be-processed image respectively to obtain a feature map of the to-be-processed image; and a determination sub-module, configured to determine, according to the feature map of the to-be-processed image, a result of association that indicates whether a correspondence exists between at least some of targets in different target images.

In one possible implementation, the fusion sub-module includes:

a splicing unit, configured to splice a target image with the attention map of one target in the target image in a set dimension to obtain a to-be-processed image; or a summing unit, configured to add a target image with the attention map of one target in the target image in a set dimension to obtain a to-be-processed image.

In one possible implementation, the feature extraction sub-module includes:

a branch unit, configured to perform feature extraction on each to-be-processed image respectively by using each network branch of a neural network to obtain a feature map of the each to-be-processed image, where feature extraction is performed on one to-be-processed image by using one network branch, and different network branches have the same network structure and network parameter.

In one possible implementation, the feature extraction sub-module includes:

an association unit, configured to perform feature association on feature maps of any two of the to-be-processed images to obtain an associated feature map; and a determination unit, configured to determine, based on the associated feature map, a result of association that indicates whether a correspondence exists between targets in target images corresponding to the two to-be-processed images, the feature maps of which are associated.

In one possible implementation, the determination unit includes:

a first association sub-unit, configured to obtain, based on the associated feature map, a score of association between targets in target images corresponding to the two to-be-processed images, the feature maps of which are associated; and a first determination sub-unit, configured to, in a case that the score of association is greater than a score threshold, determine that the targets in the target images corresponding to the two to-be-processed images, the feature maps of which are associated, are potentially associated.

In one possible implementation, the apparatus further includes:

a second determination sub-unit, configured to, in a case that the score of association is less than or equal to the score threshold, determine that the targets in the target images corresponding to the two to-be-processed images, the feature maps of which are associated, are not associated.

In one possible implementation, the determination unit includes:

a second association sub-unit, configured to obtain, based on the associated feature map, a score of association between targets in target images corresponding to the two to-be-processed images, the feature maps of which are associated; and a matching sub-unit, configured to match, according to the score of association between the respective targets in the target images corresponding to the two to-be-processed images, the feature maps of which are associated, targets in different target images to obtain a result of association that indicates whether a correspondence exists between respective targets in the different target images, where matched targets belong to different target images.

In one possible implementation, the matching sub-unit is configured to:

determine, according to the score of association between the respective targets in the target images corresponding to the two to-be-processed images, the feature maps of which are associated, a sum of scores of association between respective targets in a first target image in the different target images and respective targets in a second target image in the different target images; and in a case that the sum of scores of association is the maximum and greater than a predetermined sum-of-scores threshold, determine that the targets in the first target image respectively match the targets in the second target image.

In one possible implementation, the matching sub-unit is further configured to, in a case that the maximum sum of scores of association in the sums of scores of association is less than or equal to the sum-of-scores threshold, determine that the targets in the first target image do not match the targets in the second target image.

In one possible implementation, the at least two target images are obtained by capturing a same scene synchronously at different angles of view.

In some embodiments, the functions provided by or the modules included in the apparatuses provided in the embodiments of the present disclosure may be used to implement the methods described in the foregoing method embodiments. For specific implementations, reference may be made to the description in the method embodiments above. For the purpose of brevity, details are not described herein repeatedly.

The embodiments of the present disclosure further provide a computer-readable storage medium, having computer program instructions stored thereon, where when the computer program instructions are executed by a processor, the foregoing method is implemented. The computer-readable storage medium may be a non-volatile computer-readable storage medium.

The embodiments of the present disclosure further provide an electronic device, including: a processor; and a memory configured to store processor-executable instructions, where the processor is configured to execute the foregoing method.

The electronic device may be provided as a terminal, a server, or other forms of devices.

Figure 5:
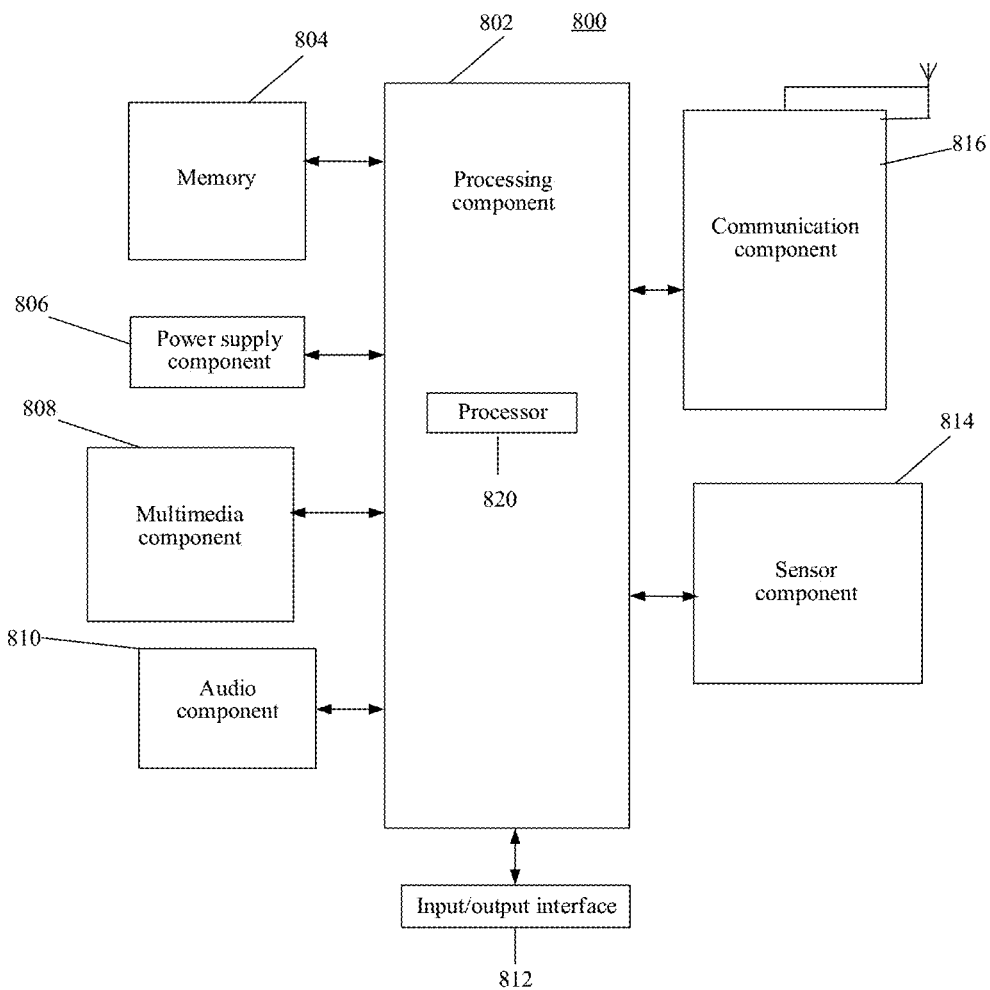
FIG. 5 shows a block diagram of an example of an electronic device according to embodiments of the present disclosure.

FIG. 5 is a block diagram of an electronic device 800 according to one exemplary embodiment. For example, the electronic device 800 may be a terminal such as a mobile phone, a computer, a digital broadcast terminal, a message transceiving device, a game console, a tablet device, a medical device, exercise equipment, and a personal digital assistant.

With reference to FIG. 5, the electronic device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and the like. The memory 804 is implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or sent by means of the communication component 816. In some embodiments, the audio component 810 further includes a speaker for outputting an audio signal.

The I/O interface 812 provides an interface between the processing component 802 and a peripheral interface module, and the peripheral interface module is a keyboard, a click wheel, a button, or the like. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect the position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In one exemplary embodiment, the communication component 816 receives a broadcast signal or broadcast-related information from an external broadcast management system by means of a broadcast channel. In one exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In an exemplary embodiment, further provided is a non-volatile computer-readable storage medium or a volatile computer-readable storage medium, for example, a memory 804 including computer program instructions, which can executed by the processor 820 of the electronic device 800 to implement the method above.

Figure 6:
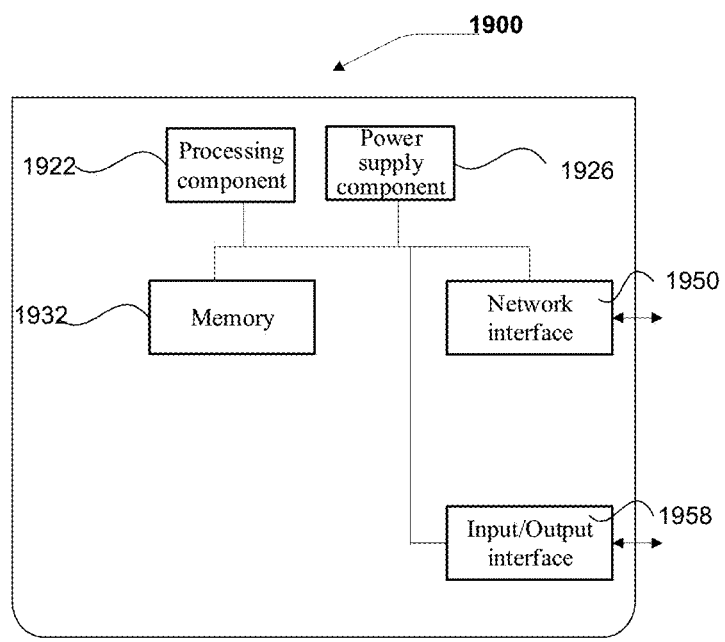
FIG. 6 shows a block diagram of an example of an electronic device according to embodiments of the present disclosure.

FIG. 6 is a block diagram of an electronic device 1900 according to one exemplary embodiment. For example, the electronic device 1900 may be provided as a server. With reference to FIG. 6, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. In addition, the processing component 1922 is configured to execute instructions so as to execute the method above.

The electronic device 1900 may further include a power component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, further provided is a non-volatile computer-readable storage medium or a volatile computer-readable storage medium, for example, a memory 1932 including computer program instructions, which can executed by the processing component 1922 of the electronic device 1900 to implement the method above.

The present disclosure may be a system, a method, and/or a computer program product. The computer program product may include a computer-readable storage medium, on which computer-readable program instructions used by the processor to implement various aspects of the present disclosure are stored.

The computer-readable storage medium may be a tangible device that can maintain and store instructions used by an instruction execution device. The computer-readable storage medium may be, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include a portable computer disk, a hard disk, a Random Access Memory (RAM), a Read-Only Memory (ROM), an Erasable Programmable Read-Only Memory (EPROM or flash memory), a Static Random Access Memory (SRAM), a portable Compact Disc Read-Only Memory (CD-ROM), a Digital Versatile Disk (DVD), a memory stick, a floppy disk, a mechanical coding device such as a punched card storing an instruction or a protrusion structure in a groove, and any appropriate combination thereof. The computer-readable storage medium used here is not interpreted as an instantaneous signal such as a radio wave or other freely propagated electromagnetic wave, an electromagnetic wave propagated by a waveguide or other transmission media (for example, an optical pulse transmitted by an optical fiber cable), or an electrical signal transmitted by a wire.

The computer-readable program instruction described here is downloaded to each computing/processing device from the computer-readable storage medium, or downloaded to an external computer or an external storage device via a network, such as the Internet, a Local Area Network (LAN), a Wide Area Network (WAN), and/or a wireless network. The network may include a copper transmission cable, optical fiber transmission, wireless transmission, a router, a firewall, a switch, a gateway computer, and/or an edge server. A network adapter card or a network interface in each computing/processing device receives the computer-readable program instruction from the network, and forwards the computer-readable program instruction, so that the computer-readable program instruction is stored in a computer-readable storage medium in each computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions can be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any type of network, including an LAN or a WAN, or may be connected to an external computer (for example, connected via the Internet with the aid of an Internet service provider). In some embodiments, an electronic circuit such as a programmable logic circuit, a Field Programmable Gate Array (FPGA), or a Programmable Logic Array (PLA) is personalized by using status information of the computer-readable program instructions, and the electronic circuit can execute the computer-readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams can be implemented with the computer-readable program instructions.

These computer-readable program instructions may be provided for a general-purpose computer, a dedicated computer, or a processor of other programmable data processing apparatus to generate a machine, so that when the instructions are executed by the computer or the processors of other programmable data processing apparatuses, an apparatus for implementing a specified function/action in one or more blocks in the flowcharts and/or block diagrams is generated. These computer-readable program instructions may also be stored in a computer-readable storage medium, and these instructions instruct a computer, a programmable data processing apparatus, and/or other devices to work in a specific manner. Therefore, the computer-readable storage medium having the instructions stored thereon includes a manufacture, and the manufacture includes instructions in various aspects for implementing the specified function/action in one or more blocks in the flowcharts and/or block diagrams.

The computer-readable program instructions may also be loaded onto a computer, other programmable data processing apparatuses, or other devices, so that a series of operation steps are executed on the computer, the other programmable apparatuses, or the other devices, thereby generating a computer-implemented process. Therefore, the instructions executed on the computer, the other programmable apparatuses, or the other devices implement the specified function/action in the one or more blocks in the flowcharts and/or block diagrams.

The flowcharts and block diagrams in the accompanying drawings show architectures, functions, and operations that may be implemented by the systems, methods, and computer program products in the embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, the functions noted in the block may also occur out of the order noted in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system configured to execute specified functions or actions, or may be implemented by using a combination of dedicated hardware and computer instructions.

The embodiments of the present disclosure are described above. The foregoing descriptions are exemplary but not exhaustive, and are not limited to the disclosed embodiments. Many modifications and variations will be apparent to a person of ordinary skill in the art without departing from the scope and spirit of the described embodiments. The terms used herein are intended to best explain the principles of the embodiments, practical applications, or technical improvements to the technologies in the market, or to enable other persons of ordinary skill in the art to understand the embodiments disclosed herein.

The invention claimed is:

1. An image processing method, comprising:
    acquiring at least two target images;
    determining an attention map of at least one target in each of the at least two target images according to a result of detecting target of each target image, wherein the attention map indicates the position of one target in the target image; and
    determining, based on a first target image of the at least two target images, a second target image different from the first target image of the at least two target images, an attention map of at least one target in the first target image, and an attention map of at least one target in the second target image, a result of association that indicates whether a correspondence exists between at least some of targets in the first target image and the second target image.

2. The method according to claim 1, wherein the determining an attention map of at least one target in each of the at least two target images according to a result of detecting target of each target image comprises:
    for one target in each target image, determining, according to the result of detecting target of the each target image, a first image region where the target is located; and
    determining the attention map of the target according to the first image region in the target image and a second image region other than the first image region in the target image.

3. The method according to claim 2, wherein the determining the attention map of the target according to the first image region in the target image and the second image region other than the first image region in the target image comprises:
    acquiring an initial image with an image size matching that of the target image;
    setting a pixel value of a pixel in a first target image region in the initial image as a first pixel value, wherein the first target image region corresponds to the first image region; and
    setting a pixel value of a pixel in a second target image region in the initial image as a second pixel value to obtain the attention map of the target, wherein the second target image region corresponds to the second image region, and the first pixel value is not equal to the second pixel value.

4. The method according to claim 1, wherein the determining, based on each target image and the attention map of the at least one target in the each target image, a result of association that indicates whether a correspondence exists between at least some of targets in different target images comprises:
    fusing a target image with the attention map of one target in the target image to obtain a to-be-processed image;
    performing feature extraction on each to-be-processed image respectively to obtain a feature map of the each to-be-processed image; and
    determining, according to the feature map of the each to-be-processed image, the result of association that indicates whether the correspondence exists between at least some of targets in different target images.

5. The method according to claim 4, wherein the fusing a target image with the attention map of one target in the target image to obtain a to-be-processed image comprises:
    splicing a target image with the attention map of one target in the target image in a set dimension to obtain a to-be-processed image; or
    adding a target image with the attention map of one target in the target image in a set dimension to obtain a to-be-processed image.

6. The method according to claim 4, wherein the determining, according to the feature map of the each to-be-processed image, the result of association that indicates whether the correspondence exists between at least some of targets in different target images comprises:
    performing feature association on feature maps of any two of the to-be-processed images to obtain an associated feature map; and
    determining, based on the associated feature map, the result of association that indicates whether the correspondence exists between targets in target images corresponding to the two to-be-processed images, the feature maps of which are associated.

7. The method according to claim 6, wherein the determining, based on the associated feature map, the result of association that indicates whether the correspondence exists between targets in target images corresponding to the two to-be-processed images, the feature maps of which are associated, comprises:
obtaining, based on the associated feature map, a score of association between targets in target images corresponding to the two to-be-processed images, the feature maps of which are associated,
in a case that the score of association is greater than a score threshold, determining that the targets in the target images corresponding to the two to-be-processed images, the feature maps of which are associated, are potentially associated,
in a case that the score of association is less than or equal to the score threshold, determining that the targets in the target images corresponding to the two to-be-processed images, the feature maps of which are associated, are not associated.

8. The method according to claim 6, wherein the determining, based on the associated feature map, the result of association that indicates whether the correspondence exists between targets in target images corresponding to the two to-be-processed images, the feature maps of which are associated, comprises:
obtaining, based on the associated feature map, a score of association between targets in target images corresponding to the two to-be-processed images, the feature maps of which are associated; and
matching, according to the score of association between the respective targets in the target images corresponding to the two to-be-processed images, the feature maps of which are associated, targets in different target images to obtain a result of association that indicates whether a correspondence exists between respective targets in the different target images, wherein matched targets belong to different target images.

9. The method according to claim 8, wherein the matching, according to the score of association between the respective targets in the target images corresponding to the two to-be-processed images, the feature maps of which are associated, targets in different target images to obtain a result of association that indicates whether a correspondence exists between respective targets in the different target images, comprises:
determining, according to the score of association between the respective targets in the target images corresponding to the two to-be-processed images, the feature maps of which are associated, a sum of scores of association between respective targets in a first target image in the different target images and respective targets in a second target image in the different target images;
in a case that the sum of scores of association is the maximum and greater than a predetermined sum-of-scores threshold, determining that the targets in the first target image respectively match the targets in the second target image;
in a case that the maximum sum of scores of association in the sums of scores of association is less than or equal to the sum-of-scores threshold, determining that the targets in the first target image do not match the targets in the second target image.

10. An electronic device, comprising:
a processor; and
a memory configured to store processor-executable instructions,
wherein the processor is configured to invoke the instructions stored in the memory, so as to execute a method including:
acquiring at least two target images;
determining an attention map of at least one target in each of the at least two target images according to a result of detecting target of each target image, wherein an attention map indicates the position of one target in a target image; and
determining, based on a first target image of the at least two target images, a second target image different from the first target image of the at least two target images, an attention map of at least one target in the first target image, and an attention map of at least one target in the second target image, a result of association that indicates whether a correspondence exists between at least some of targets in the first target image and the second target image.

11. The device according to claim 10, wherein the method further includes;
determining, according to the result of detecting target of each target image, a first image region where the target is located for one target in the each target image; and
determining the attention map of the target according to the first image region in the target image and a second image region other than the first image region in the target image.

12. The device according to claim 11, wherein the determining of the result of association further includes:
acquiring an initial image with an image size matching that of the target image;
setting a pixel value of a pixel in a first target image region in the initial image as a first pixel value, wherein the first target image region corresponds to the first image region; and
setting a pixel value of a pixel in a second target image region in the initial image as a second pixel value to obtain the attention map of the target, wherein the second target image region corresponds to the second image region, and the first pixel value is not equal to the second pixel value.

13. The device according to claim 10, wherein the determining of the result of association further includes:
fusing a target image with the attention map of one target in the target image to obtain a to-be-processed image;
performing feature extraction on each to-be-processed image respectively to obtain a feature map of the each to-be-processed image; and
determining, according to the feature map of the each to-be-processed image, the result of association that indicates whether the correspondence exists between at least some of targets in different target images.

14. The device according to claim 13, wherein the fusing of the target image further includes:
splicing a target image with the attention map of one target in the target image in a set dimension to obtain a to-be-processed image; or
adding a target image with the attention map of one target in the target image in a set dimension to obtain a to-be-processed image.

15. The device according to claim 13, wherein the performing feature extraction further includes:

performing feature association on feature maps of any two of the to-be-processed images to obtain an associated feature map; and determining, based on the associated feature map, the result of association that indicates whether the correspondence exists between targets in target images corresponding to the two to-be-processed images, the feature maps of which are associated.

16. The device according to claim 15, wherein the determining of the result of association based on the associated feature map further includes:

obtaining, based on the associated feature map, a score of association between targets in target images corresponding to the two to-be-processed images, the feature maps of which are associated;

in a case that the score of association is greater than a score threshold, determining that the targets in the target images corresponding to the two to-be-processed images, the feature maps of which are associated, are potentially associated; and in a case that the score of association is less than or equal to the score threshold, determining that the targets in the target images corresponding to the two to-be-processed images, the feature maps of which are associated, are not associated.

17. The device according to claim 15, wherein the determining of the result of association based on the associated feature map further includes:

obtaining, based on the associated feature map, a score of association between targets in target images corresponding to the two to-be-processed images, the feature maps of which are associated; and matching, according to the score of association between the respective targets in the target images corresponding to the two to-be-processed images, the feature maps of which are associated, targets in different target images to obtain a result of association that indicates whether a correspondence exists between respective targets in the different target images, wherein matched targets belong to different target images.

18. The device according to claim 17, wherein the matching of the feature maps further includes:

determining, according to the score of association between the respective targets in the target images corresponding to the two to-be-processed images, the feature maps of which are associated, a sum of scores of association between respective targets in a first target image in the different target images and respective targets in a second target image in the different target images;

in a case that the sum of scores of association is the maximum and greater than a predetermined sum-of-scores threshold, determining that the targets in the first target image respectively match the targets in the second target image; and in a case that the maximum sum of scores of association in the sums of scores of association is less than or equal to the sum-of-scores threshold, determining that the targets in the first target image do not match the targets in the second target image.

19. A non-transitory computer-readable storage medium, having computer program instructions stored thereon, wherein when the computer program instructions are executed by a processor, a method is implemented including:

acquiring at least two target images;

determining an attention map of at least one target in each of the at least two target images according to a result of detecting target of each target image, wherein the attention map indicates the position of one target in the target image; and determining, based on a first target image of the at least two target images, a second target image different from the first target image of the at least two target images, an attention map of at least one target in the first target image, and an attention map of at least one target in the second target image, a result of association that indicates whether a correspondence exists between at least some of targets in the first target image and the second target image.

* * * * *